(12) United States Patent
Parron

(10) Patent No.: US 9,887,791 B2
(45) Date of Patent: Feb. 6, 2018

(54) SYSTEM AND METHOD FOR PARTICIPANTS TO PERCEIVABLY MODIFY A PERFORMANCE

(71) Applicant: Mario Parron, St-Colomban (CA)

(72) Inventor: Mario Parron, St-Colomban (CA)

(73) Assignee: Mario Perron, Saint-Colomban (CA)

( * ) Notice: Subject to any disclaimer, the term of this patent is extended or adjusted under 35 U.S.C. 154(b) by 0 days.

(21) Appl. No.: 14/428,921

(22) PCT Filed: Sep. 17, 2013

(86) PCT No.: PCT/CA2013/000793
§ 371 (c)(1),
(2) Date: Mar. 17, 2015

(87) PCT Pub. No.: WO2014/040180
PCT Pub. Date: Mar. 20, 2014

(65) Prior Publication Data
US 2015/0270915 A1    Sep. 24, 2015

Related U.S. Application Data

(60) Provisional application No. 61/701,998, filed on Sep. 17, 2012.

(51) Int. Cl.
*H04H 60/33* (2008.01)
*H04W 4/20* (2009.01)
*H04H 20/38* (2008.01)

(52) U.S. Cl.
CPC .......... *H04H 60/33* (2013.01); *H04H 20/38* (2013.01); *H04W 4/206* (2013.01)

(58) Field of Classification Search
CPC ....... H04H 60/33; H04H 20/38; H04W 4/206; G06K 9/00771; G06K 9/00335; G06K 9/2081; G06K 9/00342; G06K 9/00355; G06F 3/017; G06F 3/0488; G06F 3/011; G06F 3/0346; G06F 3/014; G06F 1/163
USPC .......................................................... 340/4.4
See application file for complete search history.

(56) References Cited

U.S. PATENT DOCUMENTS

| 6,363,434 B1 * | 3/2002 | Eytchison ............... H04L 12/24 375/E7.019 |
| 8,988,437 B2 * | 3/2015 | Geisner ................... G06T 13/00 345/473 |
| 2002/0073183 A1 * | 6/2002 | Yoon ................... G05B 19/0421 709/220 |

(Continued)

*Primary Examiner* — Yong Hang Jiang
(74) *Attorney, Agent, or Firm* — Robert Brouillette; Brouillette Legal Inc.

(57) ABSTRACT

The present invention discloses a system and method for participants to perceivably modify a performance using participant devices. A participant device, being connected through a network to a performance, such as a conference, a live event, a pre-recorded event or any type of gathering, captures the participant input actions and communicates such input actions to a server. The server collects and aggregates the received input actions and used the aggregations to calculate modifications to the performance. The performer device of a performer being part of the performance receives and displays the calculated modification and executes such modification to perceivably modify the said performance.

25 Claims, 3 Drawing Sheets

(56) References Cited

U.S. PATENT DOCUMENTS

| | | | | |
|---|---|---|---|---|
| 2002/0177914 A1* | 11/2002 | Chase | ............... | H04H 20/103 |
| | | | | 700/94 |
| 2003/0023435 A1* | 1/2003 | Josephson | ............ | G10L 15/26 |
| | | | | 704/235 |
| 2003/0144017 A1* | 7/2003 | Inselberg | ............ | A63F 13/12 |
| | | | | 455/517 |
| 2003/0208767 A1* | 11/2003 | Williamson | ........ | G06F 3/0482 |
| | | | | 725/93 |
| 2008/0222532 A1* | 9/2008 | Mester | ............... | H04L 12/585 |
| | | | | 715/738 |
| 2013/0038702 A1* | 2/2013 | Schweitzer | ........... | A63J 25/00 |
| | | | | 348/51 |

* cited by examiner

SYSTEM AND METHOD FOR PARTICIPANTS TO PERCEIVABLY MODIFY A PERFORMANCE

CROSS-REFERENCE TO RELATED APPLICATIONS

The present patent application claims the benefits of priority of commonly assigned U.S. Provisional Patent Application No. 61/701,998, entitled "SYSTEM AND METHOD FOR PARTICIPANTS TO PERCEIVABLY MODIFY A LIVE PERFORMANCE" and filed at the United States Patent and Trademark Office on Sep. 17, 2012.

FIELD OF THE INVENTION

The present invention generally relates to systems and method to interact with entertainment services, live or recorded performances, virtual events/locations, and/or live events. In particular, the invention relates to a system and method to gather various inputs from a plurality of participants to directly modify the contents and the delivery of a live or recorded performance.

BACKGROUND OF THE INVENTION

In the last decade, consumers gained electronic or network access to most forms of electronic arts (music, theatre, movies, etc.). However live performances within a physical venue, with or without a virtual extension over TV and/or the Internet, are still a major, highly praised component of the entertainment industry. Even more, the participant to such event now want to be "part of the event" and to actually participate and interact with other participants in such a happening. The participants want to make sure they participate in most of theses events: "I was there at such or such event". An obvious example of such a trend may be found within, the Electronic Dance Music (EDM) segment of the entertainment industry. Indeed, EDM events now attract from a few hundreds people within dance clubs to literally hundreds of thousands people present at major EDM festivals around the world.

In the last few years, as smart phones and other interactive devices, but also with RFID tags, or even fluorescent bracelets have rendered possible for the participants to physically or virtually attend a selected live performance and to individually and/or collectively interact with any performer and with the computer device used by the performers (Djs, musicians, actors, etc.) to deliver their live or recorded performance.

SUMMARY OF THE INVENTION

The present invention provides systems and methods for gathering real-time inputs from a plurality of participants, processing those inputs and communicating the result to the performers and their computers in order to perceivably modify the contents and the delivery of a live performance.

As used herein, the term "performance" is intended to convey the broadest possible meaning and refers to any gathering, conference, lecture, course, happening, occurrence, appearance, ceremony, circumstance, experience, function, occasion, proceeding, situation, performance, debate, speech, election, etc. where participants may be involved with a performance or event. By way of non-limiting example, in some embodiments, the event may be a live performance for a dance party, music concert, or festival; a television show, theater show, or webcast; a live sporting event, reality show, news broadcast, or political event; a celebration, meeting, lecture, or any other live public or private live performance, or an event or activity occurring on the Internet or in a virtual location.

Furthermore, as used herein, the term "recorded performance" is intended to convey the broadest possible meaning and refers to any happening, occurrence, appearance, ceremony, circumstance, experience, function, occasion, proceeding, situation, performance, debate, speech, election, etc. where participants may be involved with a pre-recorded or recorded art material, such as audio, images or video. Such recorded material may be recorded on any electronic medium, either persistent or volatile, such as, but not limited to, electronic memory, hard drive, cloud services, databases or any other medium allowing to persist the electronic media Embodiments of the present disclosure generally provide a system and method of interactive technologies that allow participants to provide inputs to human or computer performers on site at the live event or performance or over a pre-recoded event or art material. By way of non-limiting example, the participants may press a button, wave, take pictures, record their voice, bump with their neighbors, dance, move, stop, or provide any relevant inputs like their current pulse rate, blood pressure, breathing volume, or perspiration flow that will influence the human or computer performers and perceivably modify the contents and delivery of the live event or performance.

Embodiments of the present disclosure also provide a system and method for the participants to effectively perceive that their individual and collective inputs are actually modifying the contents and delivery of the live performance, hence establishing a causality link between their participation and the live performance as it unfolds.

One object of the present invention is to provide a system for participants to perceivably modify a performance. The system comprises at least one communication network, at least one participant device connected to the communication network, wherein the at least one participant device is configured to capture one or more participant input actions and to communicate such input actions to the server, at least one performer device connected to the communication network. The at least one performer device is configured to trigger an arbitration request to the server, to display the modifications. The system further comprises at least one server connected to the communication network, wherein the at least one server is configured to execute one or more computer program that aggregates the participant device inputs received through the communication network, to calculate performance modifications based on the aggregated inputs, to communicates the performance modifications to the performer device.

Another object of the present invention is to provide a method for participants to perceivably modify a performance. The method comprises the steps to capture one or more input actions from at least one participant device, to communicate the one or more input actions from the at least one participant device to a server, for the server to aggregate the one or more input actions, for the server to calculate modifications based on the aggregated input actions and to transmit the calculated modifications to at least one performer device.

Other technical features may be readily apparent to one skilled in the art from the following figures, descriptions and claims. The features of the present invention which are believed to be novel are set forth with particularity in the appended claims.

BRIEF DESCRIPTION OF THE DRAWINGS

For a more complete understanding of this disclosure and its features, reference is made to the following description, taken in conjunction with the accompanying drawings, in which.

DETAILED DESCRIPTION OF THE PREFERRED EMBODIMENT

A novel system and method for participants to perceivably modify a performance will be described hereinafter. Although the invention is described in terms of specific illustrative embodiment(s), it is to be understood that the embodiment(s) described herein are by way of example only and that the scope of the invention is not intended to be limited thereby.

Embodiments of the present disclosure generally provide a system of interactive technologies to engage live or pre-recorded performance participants to perceivably modify the contents and delivery of such performance. By way of non-limiting example, such perceivable modifications could include: varying the tempo, adding bars, extending a phrase, repeating segments, echoing segments, varying the pitch, bend, slide, arpeggiato, ostinato of a song, DJ mix or musical live performance.

Figure 1:
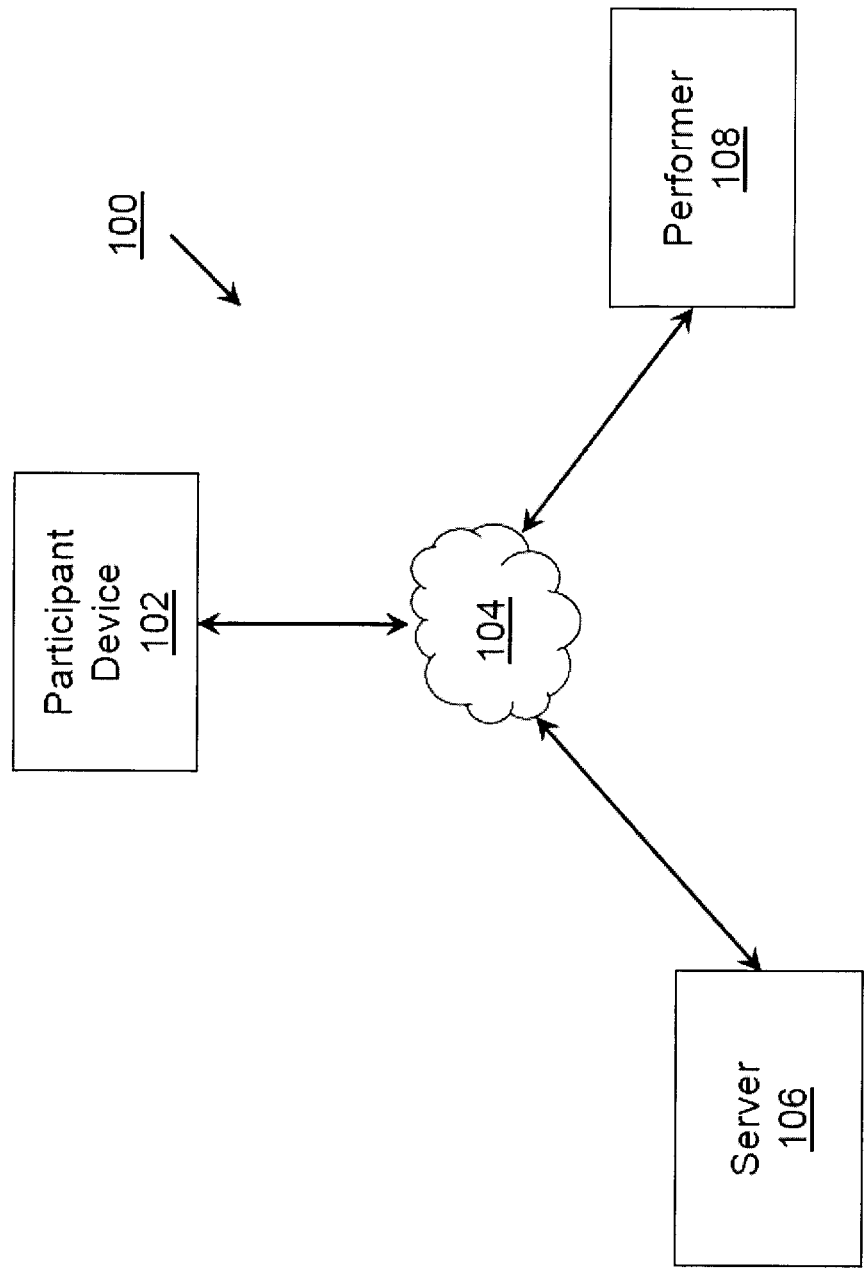
FIG. 1 is a block diagram of a system allowing inputs from participants, physically or virtually attending the live performance, to perceivably modify the contents and the delivery of a live performance according to an embodiment of the present disclosure.

To illustrate the present disclosure, FIG. 1 depicts a simplified schematic of a representative system 100 enabling the communication between at least one participant so as to provide real-time inputs to a live performance. It should be understood that system 100 shown in FIG. 1 is for illustrative purposes only and that any other suitable system could be used in conjunction or in lieu of system 100 according to one embodiment of the present disclosure.

Now referring to FIG. 1, a system for participants to perceivably modify a performance 100 typically comprises at least one participant device 102, at least one communication network 104, a least one server 106, and at least one performer or performer device 108. One skilled in the art would appreciate that the system 100 may comprise any number of suitable devices, networks, servers, or computers without departing from the object of the present disclosure.

Furthermore, it should be understood that the at least one participant device 102, at least one communication network 104, at least one server 106 and at least one performer device 108 may be integrated in a single physical unit, integrated in a plurality of physical units, or any combination thereof. As such, in another embodiment, the performer device 108 may execute or run a program acting as the server 106 and may communicate with the at least one participant device 102 through a communication network 104.

The at least one participant device 102 may be embodied as a Smartphone, a tablet, an hand-held unit, a smart watch, any wearable computing device, a wireless device, an Internet portal, an Intranet portal, a network device, a RFID tag, Ultrasound Identification (US-ID), Ultrasonic ranging (US-RTLS), Ultra-wideband (UWB) or other computing device suitable for communicating with the system, or any combination thereof.

A typical participant device 102 shall supports a plurality of real-time participant input actions, such as, but not limited to, touching the screen, pressing one or more buttons, releasing one or more buttons, moving the device in various ways such as dance moves, up and down, pumping, waving, bumping; or providing media input in the form of recorded sound or voice, picture, video sequence, or any input derived from the participant vital signs (e.g. current heart beat frequency) as directly detected by the participant device 102 or using a vital sign detection apparatus.

In a preferred embodiment, the participant device 102 comprises a central processing unit, a memory unit, a network communication unit, a display unit and a user input unit such as a touch screen or a keyboard, and a gyroscope unit. In other embodiments, the participant device 102 may comprise human vital signs sensors, one or more camera, additional gyroscope units, microphone, or any other sensor or user inputting device.

The at least one participant device 102 communicate with other components of the system 100, such as server 106, performer device 108 or any other participant device 102, via a communication network 104, such as, but not limited to wired or wireless network. If the communication network 104 is embodied as wireless network, any type of wireless network, such as wireless personal area network, wireless local area network, cellular, or any combination of one or more wireless networks may be used. For example, the system 100 may comprise a communication network 104 allowing any participant device 102 to communicate through any current commercial cellular network, such as, but not limited to, GSM/GPRS and CDMA/1×RTT, or any faster data service that might be available such as 3G services, namely EDGE, UMTS, HSPDA, EVDO and WCDMA), any latest 4G LTE network or any next generation mobile data transmission network.

Furthermore, other types of wireless communication network 104 may be used in the system 100, such as, but not limited to any wireless local area network (such as WiFi network) and any private cellular network, such as a picocell-type antenna base station configuration or a satellite based wireless system, any form of radio frequency (RF) communication, optical (could be infrared) or acoustic (could be ultrasound) network technology.

The server 106 is configured to receive and process data, signals, query requests, audio, images, and/or video, and output any such information as necessary from any number of sources, such as, participant device 102 or communication network 104. The server 106 typically comprises at least one data source, such as a database, one or more memory devices, such as RAM or storage disks, one or more applications, software, computer programs, routines, other objects, or any combination thereof.

The server 106 may be configured to communicate with one or more communication network 104 such as, for example, a dedicated communication network connection, wired connection, wireless connection Internet, Intranet, WiFi, Bluetooth, ZigBee, LAN, WAN, mobile phone communication network, social communication network, or any other suitable communication systems, or any combination thereof.

The server 106 is configured to execute one or more computer program that aggregates the participant device 102 inputs received through the communication network 104. In order for the participant device 102 to communicate with the at least on server 106 over at least one communication network 104, any communication protocol may be used, such as TCP/IP or Ethernet protocols, Bluetooth, ZigBee, RFID, XML. The server 106 is further configured to calculate performance modifications or adaptations based on the received and aggregated inputs. The server 106 may then communicates the performance modifications or adaptations to one or more selected performer devices 108 through the communication network 104. The selected performer devices 108 typically comprises or integrates a communication device allowing the performer device 108 to be connected to the server 106 through a communication network 104 or combination thereof. The performer device 108 is further configured to receive the calculated modifications or adaptations. A performer device 108 may be embodied a computing device, such as, but not limited to, computer, tablet, Smartphone, smart watch, wearable computing device, TV screen, headset, or Internet/Intranet device.

The performer device 108 is typically embodied as a computing device connected to a media generating device, such as a musical instrument, a microphone, a DJ station or computing device acting as media generating device. The performer device 108 comprises a network communication unit, a processing unit, an operating system or firmware, a display unit and an adapter to communicate with a media generating device. Typically, the performer device 108 is embodied as a computer, a smart phone, a smart tablet, an hand-held unit, a mobile phone, a wireless device, a network device or any computing device having networking capabilities. In other embodiments, the media generating device may physically integrate the performer device 108 resulting in a single unit.

Figure 2:
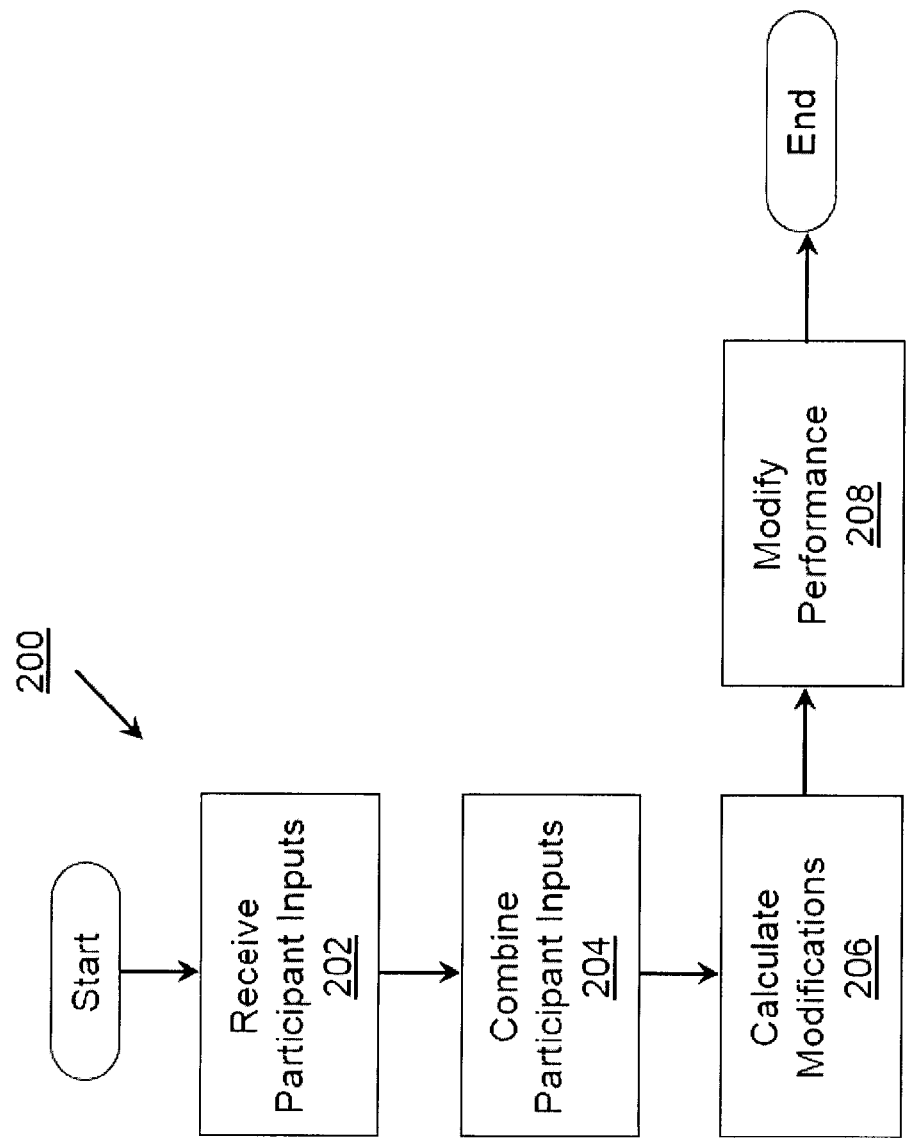
FIG. 2 is a flow diagram of a method for aggregating inputs and using the combined results to interact individually and/or collectively with performers and with the computers that are used by the performers to deliver their live or pre-recorded performance according to an embodiment of the present disclosure.

Now referring to FIG. 2, a method 200 for communicating data, audio, images and video transmissions to and from a participant device 102 is shown. The method 200 comprises the steps to capture one or more input actions from a participant device, to communicate such input actions to a server 106, to combine and/or aggregate such data and to calculate modification to the data based on the aggregated data, to transmit the calculated modifications to at least one performer 108 of the event. In one embodiment, some or all the components represented in FIG. 1 may be used in connection with this method.

The one or more participant input actions received 202 by a server 106 may be one of the followings, by way of non-limiting example, confirmation that the participants pressed a button, waved, has taken a pictures, recorded their voice, bumped with their neighbors, danced, moved, stopped, or provided any relevant inputs like their current pulse rate, blood pressure, breathing volume, or perspiration flow.

The step to combine or aggregate the received participant inputs 204 is typically realized by the executing one or more script or computer program implementing any aggregation and arbitration algorithms such as, but not limited to: "Bounded" arbitration algorithm, "High-Low" arbitration algorithm, "Round-Robin" arbitration algorithm. The selected implemented aggregation algorithm may vary according to the type of participant input actions received. In a preferred embodiment, the script or computer program may implement a method for aggregating the participant input actions which may comprise the one or more of the followings steps: to add input actions by type, to tally the input actions until t a statistically significant threshold is obtained, to compose images or pictures, to extract or super sample voice inputs, to average numerical inputs, to find minimum or maximum values, to project a result based on a minimal sample of inputs, or to map inputs onto output values table.

From the combined or aggregated participant inputs 204, a computer program or script implementing a method 200 to calculate the modifications 206 to the performance in a perceivable manner is executed on the server 106. In a preferred embodiment, such perceivable modifications may comprise one or more of the following modifications: the average collective waving frequency of the participants perceivably varying the tempo of the live performance, maintaining a button down for a certain time could add bars or extend a phrase to the performance, aggregating heart beats of participants could vary the pitch of the performance, number of participants bumping into their neighbors could bend, slide, or add arpeggiato to the live performance. These modifications are calculated by assigning the combined participant inputs 204 results to one or more available modification parameters, depending on the type of live or recorded performance and the current real-time/recorded state of the performance.

In a preferred embodiment, the modifications parameters comprise one or more of the followings: stop and then restart the music, repeat a segment of the song, speed-up or slow-down a segment of the song, change the left-right balance of the song, play the aggregated voice inputs from the participants or display a slide show of pictures taken by participants. In other embodiments, any other modification parameters may be used in order to affect the live or recorded performance.

Still referring to FIG. 2, the method 200 further comprise the step to modify a performance 208 based on the calculated modifications 206. Such calculated modifications are communicated to one or more performers device 108 and one or more performer's computer or any other performer device through communication network 104 such as, for example, a dedicated communication network connection, wired connection, wireless connection Internet, Intranet, WiFi, Bluetooth, ZigBee, LAN, WAN, mobile phone communication network, social communication network, any form of radio frequency (RF) communication, optical (could be infrared) or acoustic (could be ultrasound) technology, other suitable communication systems, or any combination thereof.

On reception of the calculated modifications by the performer device 108, the performer may manually execute the modifications displayed on the device of the performer device, typically a computer screen. In another embodiment, the reception of the calculated modifications by the performer device 108 may trigger the execution of a computer program or script. Such computer program or script is configured to process the calculated modifications and to automatically perform the modification on the performance of the performer. The modifications may be encoded or formatted to be sent as electronic messages from the server 106 to the performer device 108 via any type of messaging channel such as an API (Application Programming Interface), MIDI (Musical Instrument Digital Interface) channel, XML messaging, SMS, RPC (Remote Process Call) or any other suitable messaging channel.

Some of the steps illustrated in FIG. 2 may be combined, modified, or deleted where appropriate, and additional steps may also be added to the flow diagram. Additionally, steps may be performed in any suitable order without departing from the scope of the disclosure.

Figure 3:
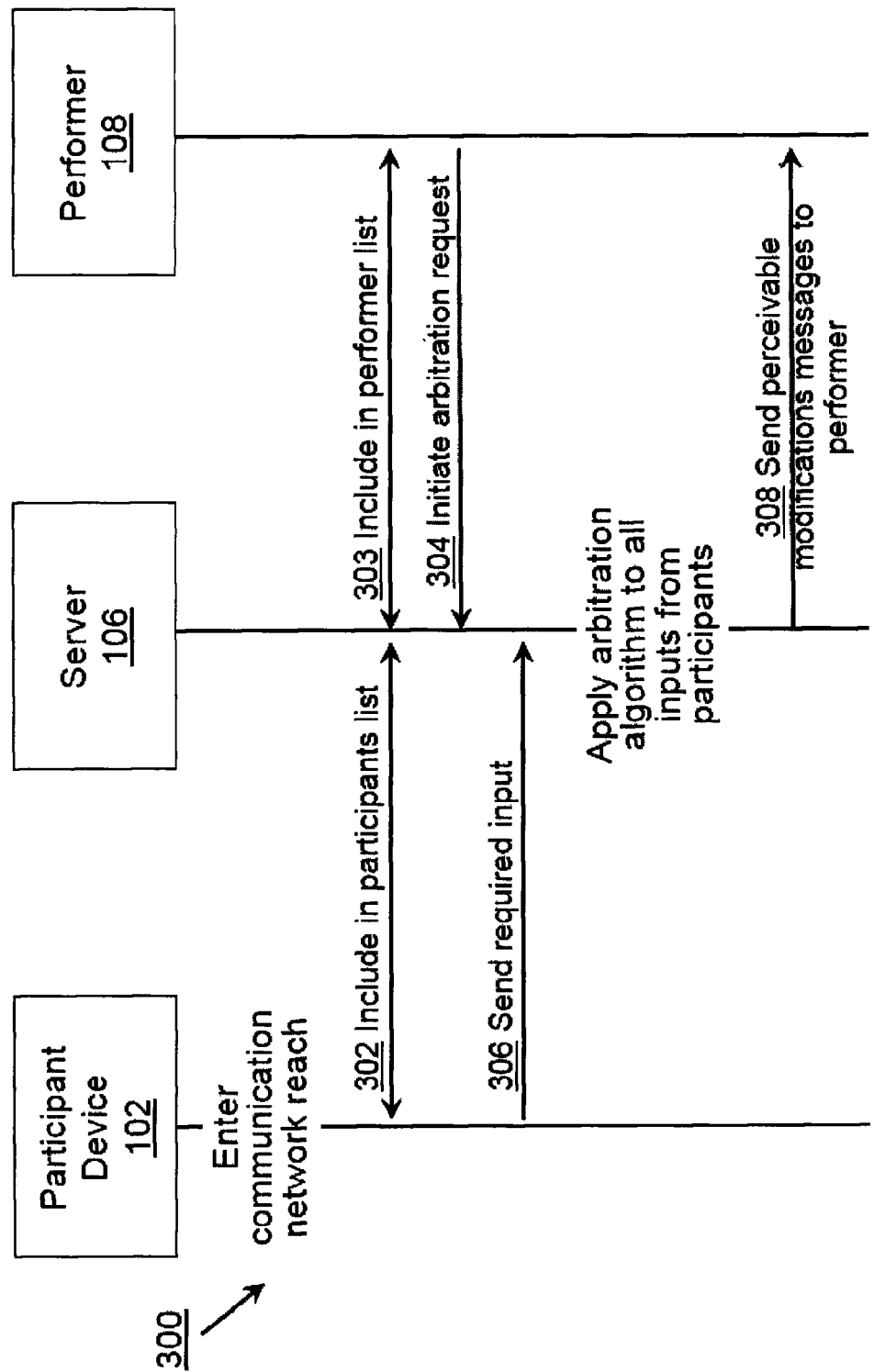
FIG. 3 is a state diagram depicting the method allowing inputs from participants, physically or virtually attending the live performance, to perceivably modify the contents and the delivery of a live or recorded performance according to an embodiment of the present invention.

Now referring to FIG. 3, an example of an implementation of a method allowing inputs from participants, physically or virtually attending the live or pre-recorded performance, to perceivably modify the contents and the delivery of such performance 300 according to an embodiment of the present invention is shown. The method 300 comprises the steps for a participant having a participant device 102 to be located within the communication network 104 reach or coverage 301. As the participant enters the communication network 104 coverage 301, the participant device 102 sends a request to the server 106 to be added to the participant list 302. On reception of such a request, the server 106 validates the participant device and adds the participant device 102 to a list of allowed or participant devices.

A performer device 108 must registers with the server 106 by sending a registration request. On reception of such registration request, the server 106 validates the performer device 108 and, if the performer device is not registered, adds the performer device 108 to the list of active performers. When registered, the performer device 108 may trigger an arbitration request to the server 106 in order to initiate an arbitration algorithm to be applied from then on to all or selected inputs received by the server 106 from participant device 102. The arbitration request may be formatted as an electronic message such as an SMS, an XML message, a RPC call parameter or through a web service request and may comprise an identifier of the performer device, such as the MAC address, the IP address or any other unique identifier, an identifier of the arbitration request and the required input description.

When the registered participant devices 102 are notified to send one or more required inputs to the server 106 for perceivably modifying the performance 306, a program being executed on the participant device 102 shows the requested one or more inputs on the display unit of the participant device 102. The participant then uses the participant device 102 to send the required one or more input actions 306. In a preferred embodiment, to reduce communication network 104 traffic, as long as a participant device 102 is registered with the server 106, it automatically sends changes to its current state on key required inputs such as standing still (Stop), pumping up and down (Pump), waving left to right and back (Wave), holding the device way up (Hands Up) or pressing on the device (Press) only when these state changes occur. Such input actions may be formatted as an electronic message such as an SMS, an XML message, a RPC call parameter or through a web service request.

The electronic message of the one or more input actions may comprise an identifier of the participant device 102, the identifier of the performer device 108 having requested the input, the identifier of the arbitration request and any other attributes related to the input action, such as, but not limited to, the duration or frequency of the waving of the device, the number of bumps within a specified duration, the vital signs of the participant, etc. The server 106 stores the received input actions within a datasource and executes a program or a script to aggregate the inputs from the participant devices 102. Following the aggregation, the server 106 applies an arbitration algorithm to calculate the modifications 307. Typically, the arbitration algorithm shall be implemented in a computer program or script that is executed by the server 106. The server 106 then formats the calculated modifications and communicates the modifications to the performer device 108 via an electronic message 308.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A system for participants to perceivably modify a live or recorded performance, the system comprising:
   a) at least one communication network;
   b) at least one participant device connected to the communication network, wherein the at least one participant device is configured to capture movement data of the at least one participant device and to communicate such movement data to a server;
   c) the at least one server being connected to the communication network, wherein the at least one server is configured:
      i) to execute one or more computer program that aggregates the movement data of each participant device received through the communication network by adding movement data by type and by mapping movement data into one or more output values tables, the computer program being further configured to aggregate the movement data by either averaging numerical movement data or finding minimum or maximum values;
      ii) to calculate performance modifications based on the aggregated movement data;
      iii) to communicate the performance modifications to at least one performer device;
   d) the at least one performer device comprising a central processing unit (CPU) being connected to the communication network, wherein the at least one performer device is configured:
      i) to deliver the live or recorded performance;
      ii) to execute the performance modifications on the live or recorded performance.

2. The system as described in claim 1, wherein the at least one server and the at least one performer device are integrated in a single physical unit.

3. The system as described in claim 1, wherein the performer device is configured to execute a program acting as the server and to communicate with the at least one participant device through the communication network.

4. The system as described in claim 1, wherein the one or more movement data is formatted as an electronic message, the electronic message comprising:
   a) an identifier of the participant device;
   b) an identifier of one or more performer device;
   c) an identifier of an arbitration request;
   d) a description of the movement data.

5. The system as described in claim 1, wherein the communication network is a cellular network.

6. The system as described in claim 1, wherein the server is further configured to receive and process data, signals, query requests, audio, images or video, and to output the processed data, signals, query requests, audio, images or video to at least one participant device, at least one performer device or a combination thereof.

7. The system as described in claim 1, wherein the performer device is connected to a media generating device.

8. The system as described in claim 7, wherein the media generating device and the performer device are integrated in one physical device.

9. The system as described in claim 7, wherein the media generating device is a musical instrument.

10. The system as describe in claim 7, wherein the media generating device is a DJ Station.

11. A method for participants to perceivably modify a live or recorded performance, the method comprising the steps:
   a) to capture at least some of movement data of at least one participant device;
   b) to aggregate the captured movement data by adding movement data by type and by mapping movement data into one or more output values tables, the aggregation of the captured movement data further comprising either averaging numerical movement data or finding minimum or maximum values:
   c) to calculate modifications based on the aggregated movement data;
   d) to perceivably modify the live or recorded performance based on the calculated modifications.

12. The method as described in claim 11, wherein the movement data is captured using the at least one participant device.

13. The method as described in claim 12, wherein the method further comprises requesting the at least one participant to move the at least one participant device for perceivably modifying the performance.

14. The method as described in claim 12, wherein the method further comprises a step to communicate the one or more input actions from the at least one participant device to a server.

15. The method as described in claim 11, wherein the step to aggregate the received participant inputs is realized by executing one or more computer program implementing aggregation algorithms.

16. The method as described in claim 15, wherein the steps to aggregate the one or more input actions and to calculate the modifications based on the aggregated input actions is executed by the server.

17. The method as described in claim 11, wherein the modifications of the performance are executed by one or more performer devices, the one or more performer devices being configured to deliver live or recorded performance.

18. The method as described in claim 17, wherein the calculated modifications are communicated to the one or more performer devices through a communication network.

19. The method as described in claim 17, wherein a performer manually executes the modifications displayed on the device of the performer device.

20. The method as described in claim 17, wherein the reception of the calculated modifications by the performer device triggers the execution of a computer program configured to process the calculated modifications and to automatically perform the modification to the performance of the performer.

21. The method as described in claim 11, wherein the one or more movement data of the participant device are selected from the followings:
   waving the participant device, bumping the participant device with another, moving or stopping.

22. The method as described in claim 11, wherein the modifications are calculated by assigning the aggregated the movement data of the participant device to one or more modification parameters which depend on the type of recorded performance and the current state of the performance.

23. The method as described in claim 22, wherein the modifications parameters comprise one or more of the followings: stop and then restart media content, repeat a segment of media content, speed-up or slow-down a segment of media content, change the left-right balance of media content, play the aggregated voice inputs from the participants or display a slide show of pictures taken by participant devices.

24. The method as described in claim 11, wherein the method further comprises the steps:
   a) to locate a participant device within a communication network coverage;
   b) to add the participant device to a participant list.

25. The method as described in claim 17, wherein the method further comprises the steps:
   a) to register the at least one performer device with a server;
   b) to add the performer device to the list of active performers.

* * * * *